United States Patent [19]
Lorig et al.

[11] Patent Number: 6,143,386
[45] Date of Patent: Nov. 7, 2000

[54] FORM FOR ROTARY PRINTING, COATING OR EMBOSSING OF SHEET-LIKE MATERIALS, AND PROCESS FOR PRODUCING SAID FORM

[76] Inventors: Heinz Lorig, Egelborger Feld 5, D-48739, Legden; Jörg Richard, Dahlienweg 54, Ahaus; Franz-Josef Giesen, Johann-Päffgen-Strasse 33, D-41569, Rommerskirchen; Klaus Langerbeins, Tannenweg 17, D-50259, Pulheim; Alfred Ernst Link, Im Brauweilerfeld 87, D-50129, Bergheim, all of Germany

[21] Appl. No.: 09/029,727

[22] PCT Filed: Jun. 26, 1997

[86] PCT No.: PCT/EP97/03349

§ 371 Date: Jun. 15, 1998

§ 102(e) Date: Jun. 15, 1998

[87] PCT Pub. No.: WO97/49535

PCT Pub. Date: Dec. 31, 1997

[30] Foreign Application Priority Data

Jun. 27, 1996 [DE] Germany .............. 196 25 749

[51] Int. Cl.⁷ .............. B29D 23/00; B05D 1/02
[52] U.S. Cl. .............. 428/36.91; 428/35.8; 428/195; 428/447; 428/450; 428/906; 492/18; 492/56; 427/355; 427/409; 427/425
[58] Field of Search .............. 428/35.8, 35.9, 428/36.5, 909, 906, 36.91, 447, 450, 195, 199, 209; 492/56, 48, 18; 427/409, 133, 425, 331, 355; 101/401.1, 375; 29/895; 430/98, 99

[56] References Cited

U.S. PATENT DOCUMENTS

| | | | |
|---|---|---|---|
| 3,858,287 | 1/1975 | Christoffersen | 492/53 |
| 4,378,622 | 4/1983 | Pinkston et al. | 492/56 |
| 5,316,798 | 5/1994 | Tittgemeyer | 427/409 |
| 5,544,584 | 8/1996 | Thompson et al. | 101/401.1 |
| 5,786,051 | 7/1998 | Niggemeier et al. | 428/35.9 |
| 5,840,386 | 11/1998 | Hatch et al. | 428/36.9 |

FOREIGN PATENT DOCUMENTS

| | | |
|---|---|---|
| 0 487 477 A1 | 11/1991 | European Pat. Off. . |
| 0 577 920 A1 | 2/1993 | European Pat. Off. . |
| 0 671 253 A2 | 3/1995 | European Pat. Off. . |
| 1180308 | 7/1957 | France . |
| 2178644 | 3/1973 | France . |
| 1569 81 | 1/1981 | Germany . |
| 1051660 | 1/1965 | United Kingdom . |
| 2 269 648 | 8/1992 | United Kingdom . |
| WO 90/06185 | 12/1989 | WIPO . |

OTHER PUBLICATIONS

Article entitled: "Technik des Flexo drucks", Deutschsprachige Flexodruck–Fachgruppe e.V. (1991), pp. 94–95.

*Primary Examiner*—Rena L. Dye
*Attorney, Agent, or Firm*—Hill & Simpson

[57] ABSTRACT

The invention relates to a form for the rotary printing, coating or imprinting of web-shaped materials and a method of producing the form wherein an elastomer layer is applied onto a carrier with a cylindrical surface area with the layer machined and engraved at the outer circumference to result in a cylindrical shape after curing. The form according to the invention is characterized in that the elastomer layer is formed of cold cure material. The engraving of the elastomer layer preferably is attained by laser engraving.

26 Claims, 2 Drawing Sheets

FORM FOR ROTARY PRINTING, COATING OR EMBOSSING OF SHEET-LIKE MATERIALS, AND PROCESS FOR PRODUCING SAID FORM

FIELD OF THE INVENTION

The invention relates to a form for the rotary machine printing, coating or imprinting of web-shaped materials, wherein at a carrier having a cylindrical surface area, an elastomer layer is attached which, after curing at the outer circumference thereof, is machined to give a cylindrical shape, and engraved. Furthermore the invention relates to a method for manufacturing the form.

BACKGROUND OF THE INVENTION

Forms of the kind mentioned before are used for different applications. In an embodiment as a printing form, e.g. for letterpress printing, in particular for flexographic printing, the outer surface of the engraved elastomer layer forms the color transferring surface. For this reason, various requirements are made imposed for the elastomer layer and the surface thereof. For example, it must have a sufficient resistance against solvents present in the printing paint, a good dynamic performance, and color transfer performance, and a small swelling under the influence of printing paints, and after the printing process it must be easily and simply cleaned of the printing paint. The requirements are similar when the form is used for coating processes, e.g. as a transfer roller for flatbed printing, in particular offset printing. The term "coating" is to be understood in particular for the transfer of printing paints in the printing processes, in particular for flexographic printing, as well as the transfer of e.g. varnishes or glues onto web-shaped materials. Depending on the requirement, a transfer across the complete surface, and also a transfer only onto selected surface areas, is possible. When the form is used as an imprinting form, the elastomer layer in particular has to comprise a good dimension stability, and wear resistance even at the common temperatures of the material to be imprinted in imprinting processes, as well as a good separating performance in order to imprint web-shaped materials with a sufficient economy. Independent from the envisioned application of the form in any case, the elastomer layer must be well engraveable. The web-shaped materials to be printed with such a form, coated, or to be imprinted, as an example may be paper or textile webs, metal or plastic foils or compound materials comprising different materials.

Hitherto, elastomer layers fulfilling all mentioned requirements on the form could only be produced by vulcanization of elastomer compounds onto temperature stable carriers at a high temperature. The temperatures required for the vulcanization, in practical operation at least 140° C., require the stock holding of appropriate devices for manufacturing the forms wherein particularly large printing forms having a length up to several meters and a circumference up to about 2 m require complicated heating devices. Therein correspondingly high energy costs are necessary for generating the required heat. Because the carrier onto which the elastomer layer is applied has to withstand the temperatures occurring during the vulcanization without damage, the selection of material for the carrier is considerably restricted namely to materials having a sufficient temperature stability. For practical reasons almost only metallic carriers may be used, whereas plastic carriers which would be preferred because of their lighter weight can hardly be used. Only premium glass fiber reinforced plastic materials are capable of coping with the high temperatures occurring during the vulcanization over the required time span. Hollow cylindrical light weight carriers may be made of these glass fiber reinforced plastic materials onto which the elastomer layer may be vulcanized, however, there is the disadvantage, that the possible variation in thickness of the carrier is very limited. Therefore, only relatively small repeat length areas may be covered in hollow cylindrical forms with a defined inner diameter for a certain firm mandrel roller outer diameter. In practical experience, it therefore happens, that in factories using the forms a very large number of different mandrel rollers have to be kept in stock. These mandrel rollers are expensive and require large warehouse space.

SUMMARY OF THE INVENTION

It is the object of the present invention to provide a form of the kind mentioned before which is to be produced in a simple and inexpensive way with the required features, and wherein for the carrier practically any materials may be used. It is a further object to provide a method of the kind mentioned before wherein the manufacturing of a form for the rotary machine printing, coating or imprinting of web-shaped materials is possible, which requires no high temperatures in its application, and wherein the selection of materials required by the carrier is not restricted by the necessity of a high temperature resistance. Therein also sleeve-shaped forms are to be produced with the method wherein a large repeat length area may be covered with a defined mandrel roller, i.e. wherein the thickness of the form may vary in relatively large ranges.

According to the invention the first part of the object is attained with a form of the aforementioned kind which is characterized in that the elastomer layer is formed of a cold cure material.

Preferably the material forming the elastomer layer is a single-component or two-component silicone polymer or a single-component or two-component polyurethane or a mixture of two or more of the materials mentioned.

The object relating to the method according to the invention is attained in a method of the aforementioned kind which is characterized in that for forming the elastomer layer a cold cure material is used.

The term "cold cure" is to be understood such that the temperatures occurring in curing the material and/or to be applied must not exceed 80° C.

It was a unexpected that cold cure materials or material mixtures, in particular the specific materials according to the present invention are suitable for generating an elastomer layer of a form for the rotary machine printing, coating or imprinting of web-shaped materials although it. was hitherto the unique opinion of the experts that an elastomer layer fulfilling all requirements could not be produced with cold cure materials. The essential advantage of the form and the method according to the invention is that the application of high temperatures and eventually even a heating device for lower temperatures are no longer required. Therefore to a far degree, temperature related restrictions in the selection of materials for the carrier are no longer valid. Therefore completely new materials may be used for the carrier which hitherto were excluded for this purpose. In particular plastic materials come to mind which hitherto could not be used because of their lower heat resistance in this area of the manufacture of forms in relation to metals. The use of plastic materials instead of metals for the carrier renders considerable reductions in weight which facilitates the transport and the handling of forms to a high degree. It is a further advantage that now the carriers may be produced with largely different material thicknesses when producing sleeve-shaped carriers and forms such that with a preset inner diameter of the carrier very different repeat lengths may be covered. Therein for the user of the sleeve-shaped forms the number of mandrel rollers to be kept in stock is reduced. At the same time the possibility remains to use metallic carriers as the elastomer layer of the cold cure materials cited sticks to a carrier of plastic material as well as to a carrier of metal after curing with a durability which is absolutely sufficient for practical operation.

The forms preferably are seamless forms; as an alternative the elastomer layer may be firstly generated in a flat shape, and then bent onto the carrier and e.g. bonded.

When the material for forming the elastomer layer is used in form of a single-component material it may be handled relatively easy and its stock holding, processing and application onto the carrier requires only a relatively small technical effort. At the other side single-component material have to be given a longer curing time or eventually heating devices for temperatures up to 80° C. are required.

As an alternative, the material can be used as a two-component material. As an advantage the curing time is shorter enabling a higher productivity and lower manufacturing costs for the form. At the other side, the use of two-component material requires a somewhat higher technical effort for the stock holding, processing and application, however, this is soon compensated when producing high numbers of forms.

Furthermore it is preferably provided that the material for forming the elastomer layer is attached to the carrier in a liquid or pasty state. By this state of the material during the application onto the carrier a simple handling will result contributing to a high productivity of the method and to its economy.

An embodiment of the alternative method described last provides that when using a single-component material, this material is processed in a single-component dosing device, and that when using a two-component material the components of this material, and when using a mixture of two or more materials, these materials are processed and prepared in a multi-component dose and mixing device. The use of such a device renders the process according to the invention technically relatively simple and reliable and provides for an inexpensive and low hazard operation and therein for a correspondingly inexpensive application of the method. Selectively a dynamic, driven mixing device or a static mixer can be used for the mixing operation.

Furthermore the process provides that the material for forming the elastomer layer is applied onto the surface area of the carrier in a rotational casting process. The rotational casting process for applying the elastomer layer onto the carrier is particularly advantageous because it requires no molds and therefore enables the production of a seamless form with simple means. Rotational casting processes are known to the expert, e.g. in the coating technique.

In order to generate a reproducible layer thickness as uniform as possible when casting the material forming the elastomer layer onto the surface area of the carrier, it is preferably provided that the casting is attained in form of a caterpillar like material string describing a helix. The helix form may be attained in a simple way by rotating the carrier about its longitudinal center axis, and by displacing the carrier and the device outputting the material string in relation to each other in longitudinal direction of the carrier. In this case for applying the method simple devices and driving means may be used which are to be manufactured and operated with low cost. Because of the liquid or pasty state of the material string which are described further above, and the rotation of the carrier, the adjacent parts of the string will flow into each other and already form a homogenous layer free from gaps and bubbles with a relatively uniform layer thickness prior to the beginning of the curing process.

Alternately to the rotational casting process the material for forming the elastomer layer is to be applied onto the surface area of the carrier in a mold casting process. The mold casting process requires the production and the application of a mold, however, the mold casting process also offers the advantage that the surfaces of the elastomer layer after the casting process comprise a larger accuracy regarding the cylindrical outer circumference form in relation to the rotational casting process.

It has found to be advantageous for gaining optimal printing, transfer or imprinting qualities and tool life-span of the form, to generate the elastomer layer with a thickness of between about 1 and 5 mm. Thereby the elastomer layer is advantageously thin resulting in a low consumption of material and contributing to low manufacturing cost for the forms. Furthermore the relative small thickness of the elastomer layer minimizes the flexing work of the elastomer layer during operation substantially contributing to long tool life-span of the forms.

At the same time, an exact geometry, in particular an exact diameter and a precise concentric running, is essential for a good printing, transfer or imprinting quality. In order to guarantee this accuracy it is provided that the elastomer layer after the curing thereof is machined by grinding to result in a cylindrical outer circumference shape.

In order to reduce the amount per form of the relatively expensive elastomer layer materials, and in order to influence the features, in particular the hardness and the resilience of the elastomer layer, it is provided that at least one filler is added to the material for forming the elastomer layer prior to applying it onto the carrier. By varying the volume ratio between the material as such at the one side and the filler or the fillers at the other side the mechanical and chemical features of the elastomer layer may be influenced in the required way over a wide range.

At least one mineral is preferably used as the filler as minerals at the one side are relatively inexpensive, and at the other side are chemically inert versus the materials silicon polymer and polyurethane.

A particularly suitable mineral for the use in the method according to the invention is aluminum hydroxide because of its chemical and physical features.

In case a form with a particularly low weight must be produced which is easy to handle and in particular inexpensive to transport, preferably a sleeve of plastic material is used as the carrier. The use of sleeves as carrriers for printing forms is known as such, however, it was hitherto only used in the area of rotogravure printing forms or block sleeves with bent and bonded block plates. The sleeves at the inner circumference thereof may be selectively cylindrical or slightly conical as is known as such; the outer circumference of the finished form in any case has to be cylindrical.

In case a plastic material sleeve is used as the carrier, this is preferably produced with a single or several layers of elastomer and/or duroplastic materials in form of foams and/or casting compounds. Therein these materials may be sensitive to temperatures as long as the form is not used as an imprinting form for imprinting hot materials like thermoplastic foils, as a vulcanization for the application of the outer elastomer layer as printing or transferring or imprinting surface is not required. Materials in particular in form of foams have a low density and therefore enable the production of sleeves with relatively large wall thicknesses without their weight being intolerably high. In this way the outer circumference of the forms may be varied over a large range while keeping the inner diameter of the sleeve constant whereby correspondingly large repeat length areas may be covered. The user of the forms has only to keep a relative low number of mandrel rollers in stock onto which the sleeve-like forms have to be attached for the printing or transfer or imprinting operation.

When forms have to be supplied to users which are prepared for the use of metal sleeves the carrier preferably is a hollow cylindrical sleeve of metal wherein the metal preferably is nickel.

Furthermore a compound construction of the carrier of plastic material and metal is possible.

In case a low weight of the forms is of no interest or if the user of the forms is not technically equipped for the use of sleeve forms, a metal cylinder may be used as the carrier, e.g. of aluminum or steel.

The engraving of the cured elastomer layer preferably is attained by laser engraving because this engraving method may be accomplished particularly fast and inexpensive, and because it may be accomplished under control of digitally stored data. Tests have shown that the surface of the elastomer layer of the form according to the invention may be engraved by laser beams. Thus the forms produced in the process mentioned fulfill particularly well the requirements for simple and fast engraving which fulfillment could not be predicted before. By a suitable selection of the degree of cross linking of the materials, and of kind and volume of the fillers eventually used the laser engravability of the elastomer layer may be set and optimized in the required way. In the ideal case the elastomer layer is directly vaporated and/or incinerated in a point without significant melting of the adjacent areas when it is hit by a focussed laser beam.

After all it may be stated that the method according to the invention with its embodiments enables the production of forms for the rotary printing, coating or imprinting of web-shaped materials fulfilling all practical requirements wherein the process may be accomplished with low technical effort and at low cost, and offers a freedom hitherto unknown regarding the selection of materials for the carrier and the geometric design thereof.

In the following four examples, are quoted for the material compositions which are suitable for forming an elastomer layer are provided. The following percent numbers always are weight percent.

EXAMPLE 1
Single-component Silicone Polymer
  reactive polydimethylsiloxane 40–90%
  non-reactive polydimethylsiloxane 5–30%
  amorphous mineral filler 2–40%
  amorphous silica 0,5–10%
  reactive silane acetate compounds 2–10%

EXAMPLE 2
Two-component Silicone Polymer
  Component A:
  polysiloxane containing vinyl groups 40–90%
  amorphous silica 0,2–10%
  platinum catalyst 0,05–3%
  multifunctional vinyl compounds 0,2–4%
  amorphous mineral filler 5–50%
  zeolithe 0,5–10%
  Component B:
  multifunctional silane compounds 2–20%

EXAMPLE 3
Single-component Polyurethane
  polyether polyol 40–80%
  amorphous mineral filler 5–40%
  carbon black 0,2–5%
  zeolithe 0,5–10%
  amorphous silica 0,5–5%
  amine catalyst 0,5–5%
  tin catalyst 0,1–1%
  multifunctional hydroxy compound 0,1–3%
  multifunctional amine compound 1–10%
  bifunctional hydroxy compound 0,5–5%
  modified isocyanate 10–40%

EXAMPLE 4
Two-component Polyurethane
  Component A:
  polyether polyol 30–80%
  amorphous mineral filler 5–50%
  carbon black 0,2–5%
  zeolithe 0,5–10%
  amorphous silica 0,1–5%
  amine catalyst 0,1–3%
  tin catalyst 0,1–1%
  multifunctional hydroxy compound 0,1–3%
  bifunctional hydroxy compound 0,15–5%
  Component B:
  diphenylmethanediisocyanate preparation 5–30%

Other objects and advantages of the present invention will become apparent upon reading the following detailed description and appended claims, and upon reference to the accompanying drawings.

BRIEF DESCRIPTION OF THE DRAWINGS

In the drawing, in the following a device is described with the help of which forms according to the invention may be produced. In the drawing.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Figure 1:
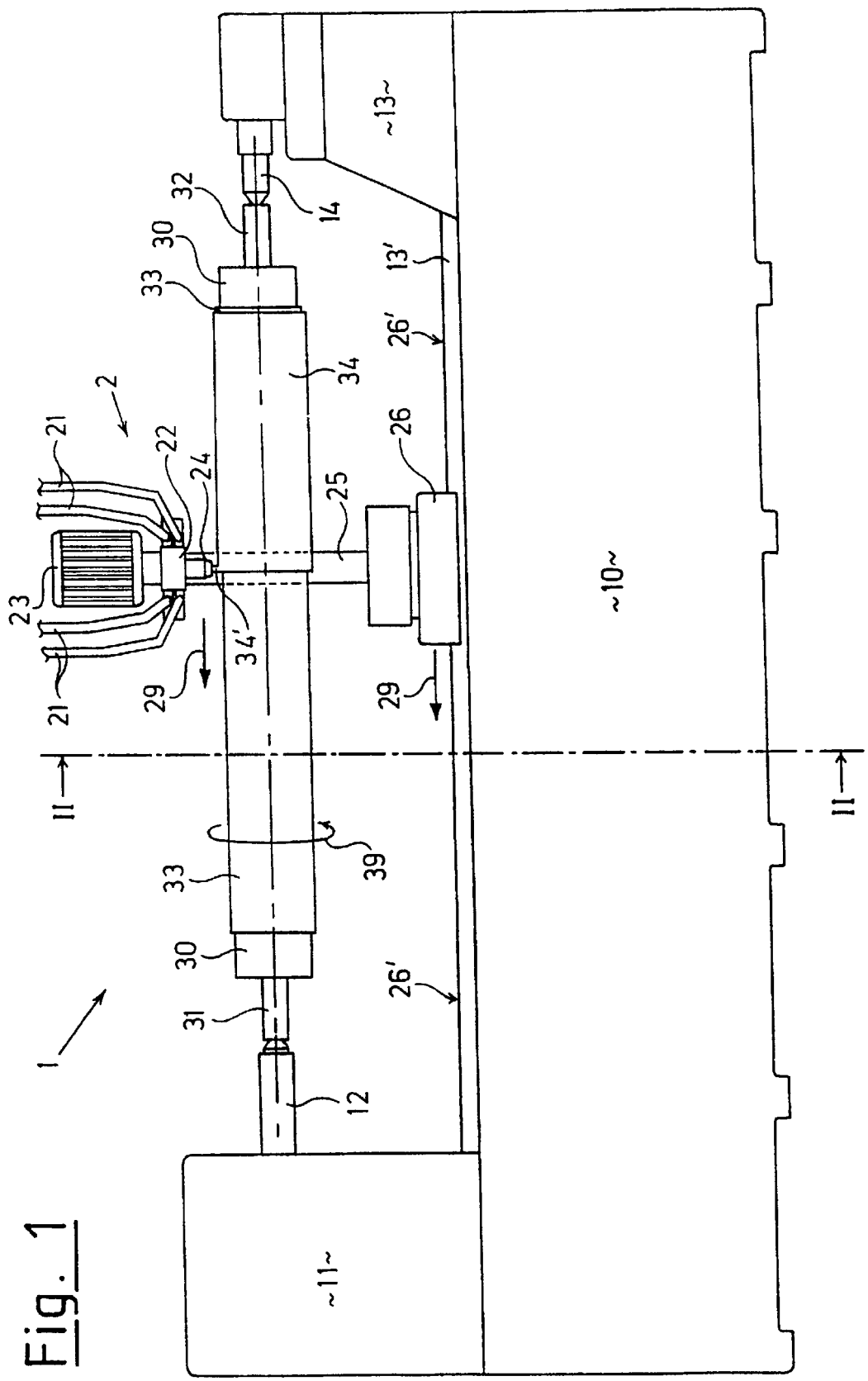
FIG. 1 illustrate a device for the production of forms in a simplified front view, and FIG. 2 the illustrates device of FIG. 1 in a cross-section taken along the line II—II in FIG. 1.

According to FIG. 1 the device 1 consists of a machine base 10 whereupon like at a lathe at the left end a spindle head 11 and at the right end a tailstock 13 is positioned. The spindle head 11 is secured at the machine base 10; a rotatable spindle 12 projects out of the spindle head 11 to the right side. The tailstock 13 at the opposite front end of the machine base 10 is displaceable in longitudinal direction of the machine base 10 in a sliding guide 13', and secureable in required positions. An idling point 14 is rotatably supported at the tailstock 13 in alignement with the spindle 12.

Between the spindle 12 and the idling point 14 a mandrel roller 30 is supported by means of its axle stubs 31, 32 such when the spindle 12 is rotated the mandrel roller 30 is also rotating about its longitudinal center axis as indicated by the rotating arrow 39.

A sleeve 33 is arranged at the mandrel roller 30 with the sleeve 33 e.g. pushed onto the mandrel roller 30 by a pressurized medium, and is removed therefrom in the same way.

Furthermore the device 1 comprises an application device 2 which is secured at a support frame 25. The support frame 25 at the lower end thereof is secured at a longitudinal slide 26 which is movable along a sliding guide 26' (not visible) in parallel with the sliding guide 13' in longitudinal direction of the machine base 10. At the upper end of the supporting frame 25, a mixing head 22 is secured as a part of the application device which mixing head comprises a dynamic mixing element with an electrically driven drive unit 23. Several pipes 21 are guided to the mixing head 22, in the example present two feeding pipes and two recirculation pipes through which the components of an elastomer material are transported from reservoirs through at least partially elastic resilient pipe areas to the mixing head 22, and when required in particular when the extrusion is discontinued are reversed. In the mixing head 22, the elastomer material is processed and mixed and subsequently extruded through a nozzle 24 arranged below the mixing head 22 in form of a material string 34' onto the outer circumference of the sleeve 33. The application is attained in form of a helix wherein the mandrel roller 30 together with the sleeve 33 rotates in direction of the rotating arrow 39, and wherein the application device 2 is moved in direction of the arrow 29 by means of the longitudinal slide 26. The turning speed of the mandrel roller 30 with the sleeve 33, and the feeding speed of the longitudinal support 26 are correlated with each other such that the single turns of the material string 34' are put directly next to each other such that a homogenous coating 34 is attained at the complete surface of the sleeve 33. In FIG. 1, the right part of the sleeve 33 has already been provided with the coating 34, this coating process is continued as described before until the left end area of the sleeve 33 is reached at.

Figure 2:
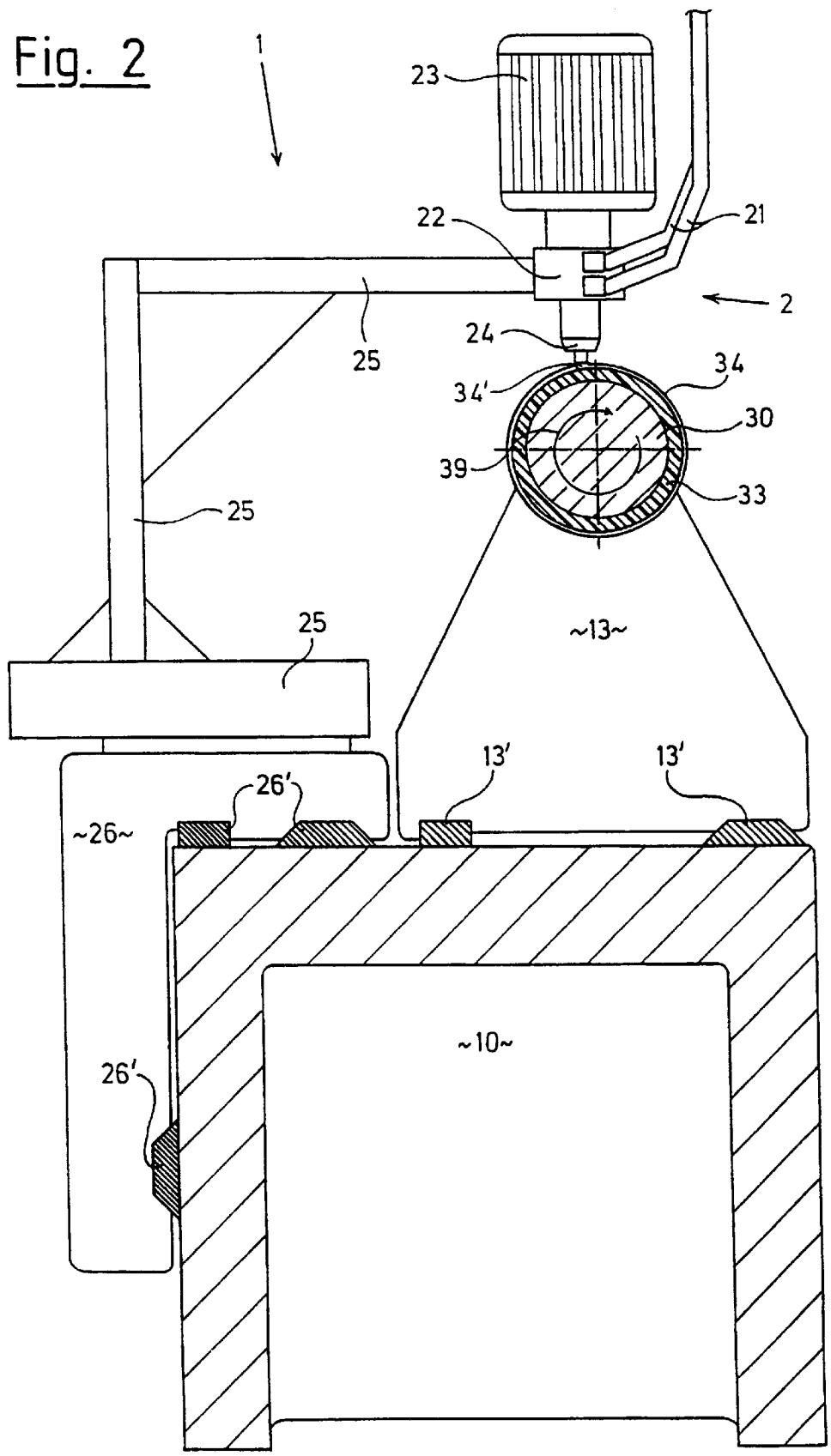

FIG. 2, in the lower part thereof, illustrates in a cross section the machine base 10. At the front part of its upper side which is on the right side of FIG. 2, the machine base 10 carries the sliding guide 13' for the tailstock 13 which is visible in the background. In the rear of the machine base 10, which is left in FIG. 2, the sliding guide 26' for the longitudinal slide 26 is positioned wherein the sliding guide 26' in this case is formed of three guiding rails in total. The support frame 25 is fastened at the upper side of the longitudinal slide 26 with the support frame extending like a gallows upwards and thereupon to the front which is the right part of FIG. 2,. At the free upper end of the support frame 25, the application device 2 is fastened. The connection between the application device 2 and the support frame 25 is attained at the mixing head 22. The feeding pipes 21 open into the mixing head 22; only two of the feeding pipes are visible here. Above the mixing head 22, the drive unit 23 thereof is visible in form of an electric motor.

The nozzle 24 projects downwards from the mixing head 22 with the material string 34 for generating the elastomer layer 34 extruding downwards from the nozzle 24. The nozzle 24 is positioned in a small distance from the outer circumference surface of the sleeve 33 which is arranged at the mandrel roller 30. As it is illustrated in FIG. 2, the mandrel roller 30 consists of metal, preferably steel, whereas the sleeve 33 consists of plastic material and therefore is light weight. The turning direction of the mandrel roller 30 with the sleeve 33 during the application of the elastomer layer 34 is indicated by the turning arrow 39.

After finishing the coating 34, the sleeve 33 together with the associated mandrel roller 30 or separated there-from is stored until the coating 34 is completely cured; thereupon the outer surface of the coating 34 is brought in an exact cylindrical shape preferably by a grinding operation. Thereupon the surface of the coating 34 is engraved preferably by laser engraving. The grinding as well as the engraving of the elastomer layer 34 at the sleeve 33 may be accomplished with known devices such that no new technology is required in addition.

From the above description, it is apparent that the object of the present invention have been achieved. While only certain embodiments have been set forth, alternative embodiments and various modifications will be apparent from the above description to those skilled in the art. These and other alternatives are considered equivalents and within the spirit and scope of the present invention.

What is claimed is:

1. A form for printing, coating and imprinting, the form comprising:

a carrier having a cylindrical outer surface, the cylindrical outer surface being coated with an elastomer layer, the elastomer layer having a cured outer surface that is machined and engraved, the cured outer surface of the elastomer layer having a cylindrical shape, the elastomer layer comprising a cold cure material comprising a material selected from the group consisting of a single-constituent silicone polymer, a two-constituent silicone polymer and a mixture of a single-constituent silicone polymer and a two-constituent silicone polymer, and wherein the engraved outer surface is generated by laser engraving.

2. The form of claim 1 wherein the elastomer layer comprises a single-constituent silicone polymer.

3. The form of claim 1 wherein the elastomer layer comprises a two-constituent silicone polymer.

4. A method of manufacturing a form for printing, coating and imprinting, the method comprising the following steps:

providing a carrier having a cylindrical outer surface, coating the cylindrical outer surface of the carrier with an elastomer layer comprising a cold cure material comprising a material selected from the group consisting of a single-constituent silicone polymer, a two-constituent silicone polymer and a mixture of a single-constituent silicone polymer and a two-constituent silicone polymer, curing the outer surface of the elastomer layer, machining the outer surface of the elastomer layer, and laser engraving the outer surface of the elastomer layer.

5. The method of claim 4 wherein the machining and laser engraving steps provide the elastomer layer with a cylindrical shape.

6. The method of claim 4 wherein the elastomer layer comprises a single-constituent silicone polymer.

7. The method of claim 4 wherein the elastomer layer comprises two-constituent silicone polymer.

8. The method of claim 7 wherein
the coating step is carried out with a multiple-constituent dosing device.

9. The method of claim 8 wherein the liquid elastomer is applied to the outer surface of the rotating carrier in a helical pattern.

10. The method of claim 4 wherein the coating step further comprises coating the cylindrical outer surface of the carrier with an elastomer layer comprising a cold cure material when the elastomer is in a liquid state.

11. The method of claim 4 wherein the coating step is carried out with a single-constituent dosing device.

12. The method of claim 4 wherein the coating step is carried out by rotating the carrier and depositing liquid elastomer on the rotating carrier.

13. The method of claim 4 wherein the coating step further comprises coating the cylindrical outer surface of the carrier with an elastomer layer by mold casting the elastomer onto the cylindrical outer surface of the carrier.

14. The method of claim 4 wherein the elastomer layer has a thickness ranging from about 1 mm to about 5 mm.

15. The method of claim 4 wherein the machining step comprises grinding.

16. The method of claim 4 wherein the elastomer layer further comprises at least one filler.

17. The method of claim 16 wherein the filler comprises a mineral filler.

18. The method of claim 16 wherein the filler comprises aluminum hydroxide.

19. The method of claim 4 wherein the carrier comprises a sleeve of plastic material.

20. The method of claim 19 wherein the sleeve comprises a plurality of layers, at least one of the layers comprising a foam.

21. The method of claim 19 wherein the sleeve comprises a plurality of layers, at least one of layers comprising a casting compound.

22. The method of claim 4 wherein the carrier comprises a metal cylinder, the metal being selected from the group consisting of nickel, aluminum and steel.

23. The method of claim 4 wherein the engraving step comprises laser engraving.

24. A method of manufacturing a form for printing, coating and imprinting, the method comprising the following steps:
providing a carrier having a cylindrical outer surface,
rotating the carrier,
coating the cylindrical outer surface of the rotating carrier with a liquid elastomer material, the elastomer comprising a cold cure material comprising a material selected from the group consisting of a single-constituent silicone polymer, a two-constituent silicone polymer and a mixture of a single-constituent silicone polymer and a two-constituent silicone polymer,
curing the outer surface of the elastomer layer,
machining the outer surface of the elastomer layer to provide the outer surface of the elastomer layer with a cylindrical shape, and
laser engraving the outer surface of the elastomer layer.

25. The method of claim 24 wherein the elastomer material comprises in weight percent:
reactive polydimethylsiloxane 40–90%
non-reactive polydimethylsiloxane 5–30%
amorphous mineral filler 2–40%
amorphous silica 0.5–10%
reactive silane acetate compounds 2–10%.

26. The method of claim 24 further comprises the following step prior to the coating step:
mixing a first constituent and a second constituent to provide the elastomer, the first constituent comprising the following components in weight percent of the elastomer material:
polysiloxane containing vinyl groups 40–90%
amorphous silica 0.2–10%
platinum catalyst 0.05–3%
multifunctional vinyl compounds 0.2–4%
amorphous mineral filler 5–50%
zeolithe 0.5–10%
the second constituent comprising in weight percent of the elastomer material:
multifunctional silane compounds 2–20%.

* * * * *